United States Patent
Tsirkin et al.

(10) Patent No.: US 9,720,846 B2
(45) Date of Patent: *Aug. 1, 2017

(54) MEMORY SWAP FOR DIRECT MEMORY ACCESS BY A DEVICE ASSIGNED TO A GUEST OPERATING SYSTEM

(71) Applicant: Red Hat Israel, Ltd., Raanana (IL)

(72) Inventors: Michael Tsirkin, Raanana (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,318

(22) Filed: May 28, 2015

(65) Prior Publication Data

US 2016/0350236 A1    Dec. 1, 2016

(51) Int. Cl.
| | |
|---|---|
| G06F 12/00 | (2006.01) |
| G06F 12/1081 | (2016.01) |
| G06F 3/06 | (2006.01) |
| G06F 9/455 | (2006.01) |
| G06F 12/06 | (2006.01) |
| G06F 13/28 | (2006.01) |

(52) U.S. Cl.
CPC .......... *G06F 12/1081* (2013.01); *G06F 3/061* (2013.01); *G06F 3/0604* (2013.01); *G06F 3/0638* (2013.01); *G06F 3/0673* (2013.01); *G06F 9/45558* (2013.01); *G06F 12/0646* (2013.01); *G06F 13/28* (2013.01); *G06F 2009/45579* (2013.01); *G06F 2009/45583* (2013.01); *G06F 2212/1016* (2013.01); *G06F 2212/65* (2013.01)

(58) Field of Classification Search
None
See application file for complete search history.

(56) References Cited

U.S. PATENT DOCUMENTS

| | | |
|---|---|---|
| 7,421,533 B2 | 9/2008 | Zimmer et al. |
| 7,613,898 B2 | 11/2009 | Haertel et al. |
| 7,702,826 B2 | 4/2010 | Oztaskin et al. |
| 7,840,765 B2 | 11/2010 | VelurEunni |
| 7,849,272 B2 | 12/2010 | Kalmuk et al. |
| 7,984,108 B2 | 7/2011 | Landis et al. |

(Continued)

OTHER PUBLICATIONS

Abel Gordon; Towards Exitless and Efficient Paravirtual I/O; IBM Research—Hafia; Jun. 4, 2012; http://www.mulix.org/pubs/eli/elvis-systor12.pdf.

(Continued)

*Primary Examiner* — Daniel Tsui
(74) *Attorney, Agent, or Firm* — Lowenstein Sandler LLP (57) ABSTRACT

A hypervisor detects a page fault associated with the request for a device assigned to a guest operating system to perform direct memory access (DMA) of a requested page of memory, invalidates a mapping in a central processing unit (CPU) page table of a guest physical address to a host physical address for a candidate page for being swapped out of host memory, checks a DMA access state of the candidate page to determine whether or not the candidate page can be swapped out from the host memory, and removes the candidate page from the host memory in response to determining that the DMA access state indicates that the candidate page can be swapped out.

18 Claims, 5 Drawing Sheets

(56) References Cited

U.S. PATENT DOCUMENTS

| | | | |
|---|---|---|---|
| 8,001,543 B2 | 8/2011 | Wooldridge et al. | |
| 8,392,628 B2 | 3/2013 | Santos et al. | |
| 8,645,611 B2 | 2/2014 | Tian | |
| 8,892,788 B2 | 11/2014 | Tsirkin | |
| 8,954,959 B2 | 2/2015 | Tsirkin et al. | |
| 2008/0040565 A1 | 2/2008 | Rozas et al. | |
| 2008/0201540 A1 | 8/2008 | Sahita et al. | |
| 2009/0037680 A1 | 2/2009 | Colbert et al. | |
| 2011/0202919 A1 | 8/2011 | Hayakawa et al. | |
| 2012/0072906 A1* | 3/2012 | Tsirkin | G06F 12/1009 718/1 |
| 2012/0216188 A1* | 8/2012 | Tsirkin | G06F 9/45558 718/1 |
| 2013/0013877 A1* | 1/2013 | Tian | G06F 12/10 711/165 |
| 2013/0031293 A1* | 1/2013 | Van Riel | G06F 12/10 711/6 |
| 2013/0061020 A1* | 3/2013 | Koob | G06F 13/28 711/202 |
| 2013/0145051 A1 | 6/2013 | Kegel et al. | |
| 2013/0145055 A1* | 6/2013 | Kegel | G06F 13/28 710/26 |
| 2014/0068137 A1 | 3/2014 | Kegel et al. | |
| 2015/0006783 A1 | 1/2015 | Chew | |
| 2015/0261616 A1* | 9/2015 | Lim | G06F 11/1446 710/308 |
| 2015/0378641 A1 | 12/2015 | Franke et al. | |
| 2016/0162316 A1* | 6/2016 | King | G06F 9/45558 718/1 |

OTHER PUBLICATIONS

TW Burger; Intel® Virtualization Technology for Directed I/O (VT-d): Enhancing Intel Platforms for Efficient Virtualization of I/O Devices; Mar. 5, 2012.

VirtDriver Guest CPU Memory Placement; https://wiki.openstack.org/wiki/VirtDriverGuestCPUMemoryPlacement.

U.S. Appl. No. 14/724,308, Non-Final Office Action mailed Feb. 22, 2017, 5 pages.

\* cited by examiner

MEMORY SWAP FOR DIRECT MEMORY ACCESS BY A DEVICE ASSIGNED TO A GUEST OPERATING SYSTEM

TECHNICAL FIELD

The present disclosure relates to memory swap, and more particularly, to memory swap for direct memory access by a device assigned to a guest operating system.

BACKGROUND

Direct memory access (DMA) allows hardware devices in a computer to access system memory for reading and/or writing independently of the central processing unit (CPU). Hardware devices that are capable of performing DMA include disk drive controllers, graphics cards, network cards and sound cards. While a hardware device is performing the DMA, the CPU can engage in other operations. DMA is especially useful in real-time computing applications where it is critical to avoid the stalling of concurrent operations.

A computer having DMA-capable devices often uses an input/output memory management unit (IOMMU) to manage address translations. In a virtual machine system, the guest operating system of a virtual machine usually does not know the host physical address that it accesses. Instead, the virtual machine system operates using virtualized guest physical addresses. Typically, it is unlikely that all of the virtual machines will use all of their respectively allocated memory at the same time, and the host system may allocate more virtual memory to the virtual machines than what the host system actually has in the physical memory. As a result, some of the allocated memory may be swapped out to a secondary data storage when it is not in use for a period of time. With conventional DMA systems, if a device is assigned to a guest operating system of a virtual machine and performs DMA to an address not currently resident in the memory, an error can occur. Most devices in traditional DMA system cannot recover from such errors and handling the error recovery in real time incurs significant overhead that degrades the performance of the system.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe memory swap for direct memory access by a device assigned to a guest operating system. A computer system can host one or more virtual machines. Each virtual machine can host a virtual CPU (central processing unit), a guest operating system (OS), and is allocated virtual memory. The virtual memory can be mapped to physical host memory in the computer system. The computer system can run a hypervisor to virtualize access to the underlying host hardware (e.g., host memory), making the use of the virtual machines transparent to the guest operating systems and the user of the computer system.

The computer system can allow memory overcommit, which can provide for the assignment of more virtual memory to virtual computing devices than the physical memory that is in the computer system. Memory swap can be used for managing memory overcommit. Virtual memory that is not commonly used can be removed from a processor mapping that maps the virtual memory to the physical host memory. The virtual memory that is removed can be marked as not present in a page table. Generally, when there is an attempt by a virtual CPU to access virtual memory that has been removed from the host memory, a page fault can be triggered, which may cause the requested virtual memory to be retrieved and placed into the host memory. However, with conventional systems, when a device is assigned to a guest OS and attempts direct memory access (DMA) of data that is not resident in the host memory, a page fault cannot be triggered and an error can be generated. The computer system can include one or more devices that use DMA to directly access the physical host memory without involving a CPU. A device can be assigned to a guest OS.

Implementations of the present disclosure allow DMA by a device assigned to a guest OS even for requests where a page of memory is not resident in the host physical memory. Implementations of the present disclosure include a guest OS that detects a DMA request for a device to perform DMA of a page of memory. Prior to the page being accessed, the guest OS can set a DMA access state for the requested page to indicate that the requested page is to be accessed by DMA. The guest OS can then cause a virtual CPU to access the requested page and send the DMA request to the device. If the requested page is not resident in the host physical memory and a swap out operation should be performed, a hypervisor can detect the page fault and invalidate a mapping in a CPU page table for a candidate page to be swapped out. The hypervisor can check the DMA access state for the candidate page to be swapped out to determine if the candidate page can be swapped out. If the candidate page can be swapped out, the hypervisor can invalidate a mapping for the candidate page in an IOMMU (input/output memory management unit) page table and remove the candidate page from host memory.

Figure 1:
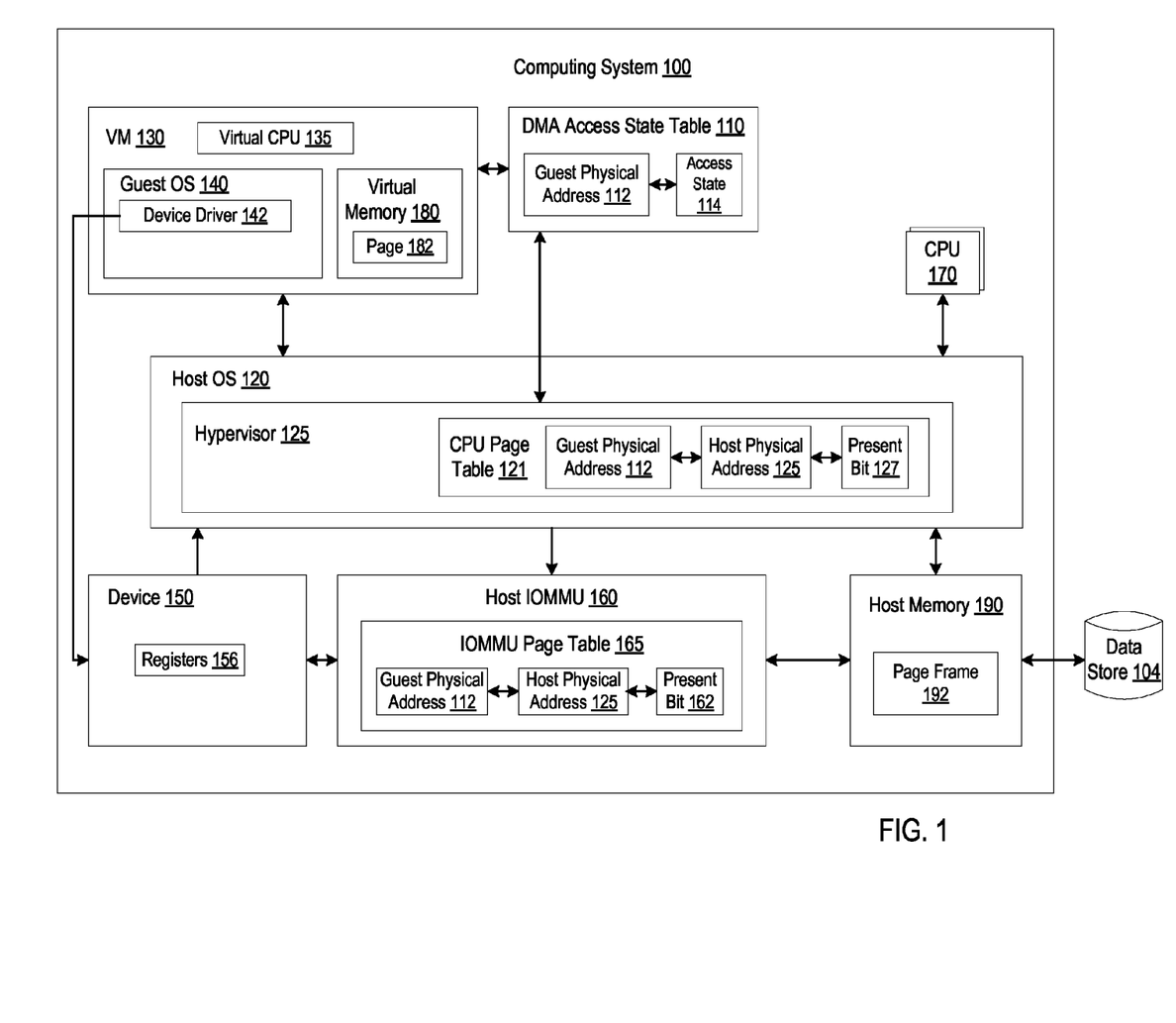
FIG. 1 illustrates an example computer system, in accordance with one or more implementations of the present disclosure.

FIG. 1 is an example computer system 100 in accordance with one or more implementations of the present disclosure. The computer system 100 can host one or more virtual machines (VM) 130. Each virtual machine 130 runs a guest operating system (OS) 140. The virtual machines 130 may have the same or different guest operating systems 140. The computer system 100 may be a server computer, a desktop computer, a set-top box, a portable computing device such as, and not limited to, netbooks, laptop computers, an electronic book reader, and the like.

The computer system 100 runs a host OS 120 to manage system resources. In one implementation, the computer system 100 runs a hypervisor 125 to virtualize access to the underlying host hardware, making the use of the virtual machine 130 transparent to the guest operating systems 140 and the user of the computer system 100. In some implementations, the hypervisor 125 may be part of the host OS 120. The computer system 100 includes hardware components such as one or more physical central processing units (CPUs) 170, memory 190 (also referred to as "host memory", "host physical memory", or "physical memory") and other hardware components. There can be more than one CPU 170. A CPU 170 can be a multi-core processor and each core of a CPU 170 can be used to assign a virtual CPU 135 to a virtual machine 130.

The computer system 100 includes one or more devices 150 (also referred to as "physical devices," for example, audio/video devices, network interface devices, printers, graphics modules, etc.) that are capable of performing direct memory access (DMA) transactions. For simplicity of the illustration, only one device 150 is shown. It is understood that the computer system 100 may include any number of devices.

System 100 includes physical host memory 190 (main memory), such as volatile memory (e.g., random access memory (RAM)). The host memory 190 is memory that is actually present in the computing system 100 and has physical addresses (host physical addresses). Each virtual machine 130 can be assigned virtual memory 180 that contains a virtual address space that is mapped to host memory 190. The host memory 190 can be addressed by the physical devices (e.g., the device 150). The host memory 190 is distinguishable from virtual memory 180, which is addressed by the guest OS 140. Virtual memory 180 is a virtual address space having virtual addresses (hereinafter also referred to as "guest physical addresses"). The guest physical addresses are in the virtual address space of the virtual memory 180 that is assigned to the guest OS 140 and are considered by the guest OS 140 to be its physical address space. The host physical addresses are in the physical address space of the host memory 190 and can be used to access the host memory 190.

The physical address space for the host memory 190 is divided into equal-sized pieces called page frames 192. The page frames 192 of the host memory 190 are accessible by corresponding host physical addresses. For simplicity of the illustration, only one page frame 192 is shown. It is understood that the host memory 190 may include any number of page frames.

A virtual address space is divided into equal-size pieces called pages 182 and are accessible by corresponding guest physical addresses. For simplicity of the illustration, only one page 182 is shown. It is understood that the virtual memory 180 may include any number of pages. A "page," "memory page," or "virtual page" is a fixed-length contiguous block of virtual memory 180 described by a single entry in a CPU page table 121 in the hypervisor 125. A CPU page table 121 is a data structure to store the mappings between guest physical addresses 112 and host physical addresses 125. The CPU page table 121 can keep track of the pages that are resident in the host memory 190. The CPU page table 121 can include page table entries for the range of guest physical addresses that is allocated to a guest OS 140. Each mapping between a guest physical address 112 to a host physical address 125 can include a present bit 127 for each page to indicate whether or not the page that corresponds to the guest physical address 112 is physically residing in the host physical address 125 for a page frame 192 in the host memory 190. In one implementation, a present bit 127 that is enabled (e.g., set to a one value) indicates that the a page is in host memory 190 and a present bit 127 that is disabled (e.g., set to a zero value) indicates that the page is not present in the host memory 190.

The computer system 100 may also be coupled to one or more data stores 104. The data stores 180 can be secondary storage to the host memory 190. The data store 104 can be a persistent storage that is capable of storing data. A persistent storage can be a local storage unit or a remote storage unit. Persistent storage can be disk, a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The computer system 100 can support over-commitment of memory, where the virtual address space allocated to the virtual machines 130 exceeds the available physical address space in the computer system 100. With a virtual address space, the system 100 can identify pages 182 that are mapped to page frames 192 of the host memory 190 (e.g., RAM) that have not been accessed recently and move the data of the identified pages 182 onto a secondary storage (e.g., data store 104). Virtual memory can free up space in the host memory 190 to load data for other pages 182 into the host memory 190 and can emulate an unlimited host memory 190 space even though system 100 may have limited physical host memory 190 installed.

A device 150 can be assigned to a guest OS 140, and the guest OS 140 can include a device driver 142 for the device 150. A device 150 can support direct memory access (DMA) to transfer its I/O data directly to and from the host memory 190 without the need to involve the CPU 170. The device 150 performs DMA using a DMA buffer. The DMA buffer is in the address space allocated to one of the virtual machines 130. The DMA buffer can be used by the device 150 to directly transfer input data to the virtual machine 130 and/or directly transfer output data from the virtual machine 130. In traditional DMA systems, only a portion of the virtual memory 180 for a guest OS 140 is accessible to a device 150 for DMA, and the bus addresses for the portion of virtual memory 180 for DMA are generally stored in registers 156.

Generally, when a device 150 attempts to access the host memory 190, the host IOMMU 160 translates the bus address into a host physical address. In conventional DMA systems, since only a portion of virtual memory 180 is used for DMA, the host IOMMU 160 is updated when the portion of virtual memory 180 for DMA changes. Conventional DMA systems incur system and resource overhead by exiting to the hypervisor 125 to update the host IOMMU 160 translations.

Unlike conventional DMA systems, implementations of the present disclosure allocate all of the virtual memory 180 for a guest OS 140 to be accessible to the device 150 for DMA. The DMA buffer spans all of the pages 182 in the virtual memory 180. All of the guest physical addresses for the virtual machine 130 can be passed to the device driver 142 and programmed by the device driver 142 into the device registers 156 as the addresses of the DMA buffer. For simplicity of discussion, only one guest physical address being used as a bus address is described. It is understood that a DMA transaction may involve multiple guest physical addresses to be used as bus addresses.

Implementations of the present disclosure include a host IOMMU 160 to implement an IOMMU page table 165 and a one-time translation of the guest physical addresses 112 of the pages of the virtual address space to the host physical addresses 125 of the physical page frames of the host memory 190. The host IOMMU 160 can be a separate component from the device 150 or may be located within the device 150. The IOMMU page table 165 is a one-time mapping of all of the guest physical addresses 112 to the host physical addresses 125. With all of the guest physical addresses 112 mapped to the host physical addresses 125, there is no change in the mapping, which results in no need to further update the mappings in IOMMU page table 165 or in the CPU page table 121, which reduces the overhead conventionally incurred for exiting the to the hypervisor 125 to perform the updates. In one implementation, there is no IOMMU page table 165, and the processor architecture supports the host IOMMU 160 having a redirected table to use the CPU page table 121.

Each mapping in the IOMMU page table 165 between a guest physical address 112 to a host physical address 125 can include a present bit 162 for each page to indicate whether or not the page that corresponds to the guest physical address 112 is physically residing in the host physical address 125 for a page frame 192 in the host memory 190. In one implementation, a present bit 162 that is enabled (e.g., set to a value of one) indicates a valid mapping where a page is in host memory 190 to allow the device 150 can access the page in the host memory 190. In one implementation, a present bit 162 that is disabled (e.g., set to a value of zero) indicates an invalidate mapping where a page is not present in the host memory 190 and the device 150 cannot access the page.

Unlike traditional DMA systems that do not support page faults for DMA by a device 150 that is assigned to a guest OS 140, implementations of the present disclosure include a guest OS 140 to support DMA by the device 150, even for a requested page 182 that is not currently residing in the host memory 190. The device driver 142 can receive a request, for example from an application or process running the virtual machine 130, to access a page 182 at a particular page guest physical address. The guest OS 140 can detect the request, and can set the DMA access state for the requested page in a DMA state table 110. The guest OS 140 can create and maintain a DMA state table 110 for each virtual machine 130 to track which pages 182 in the virtual memory 180 for the particular virtual machine 130 are being accessed through DMA by a corresponding device 150 and/or are going to be accessed by DMA by the corresponding device 150 in the near term. The DMA state table 110 can include the guest physical addresses 112 of the pages 182 in the virtual memory 180 for the particular guest OS 140, and an access state 114 for each guest physical address 112. In one implementation, the access state 114 is represented by one or more bits. In one implementation, the access state 114 is represented by a counter or a count, which may monitor different parts of the same page for DMA simultaneously from two different devices. In one implementation, the counter is a bit (e.g., 0 or 1). In one implementation, the counter is an integer or long (e.g., 32 or 64 bit).

The access states 114 can indicate which pages 182 are being accessed or are going to be accessed in the near term and should have data present in the host memory 190. In one implementation, an access state 114 that is enabled (e.g., set to a one value) indicates that the data for a page 182 is in host memory 190 and should not be swapped out of the host memory 190. In one implementation, an access state 114 that is disabled (e.g., set to zero value) indicates that the page 182 is not being accessed or will not be accessed in the near term and the page 182 can be swapped out of the host memory 190.

Before the DMA request is sent to the device 150, the guest OS 140 causes the virtual CPU 135 to request access to the page at the requested page guest physical address, and then sends the DMA request to the device 150. If the requested page is already loaded in a page frame 192 in the host memory 190, there is no exit to the hypervisor 125 and the device 150 can use the mapping in the IOMMU page table 165 to access the requested page in the host memory 190.

If the requested page is not loaded in a page frame 192 in the host memory 190, a page fault is triggered by the virtual CPU's attempt to access the requested page, and the hypervisor 125 can take control to load the requested page into the host memory 190. Unlike traditional DMA systems, implementations of the present disclosure include a hypervisor 125 that checks the DMA state table 110 to determine whether a page can be swapped out of the host memory 190 if there is not enough host memory 190 for loading the requested page.

Figure 2:
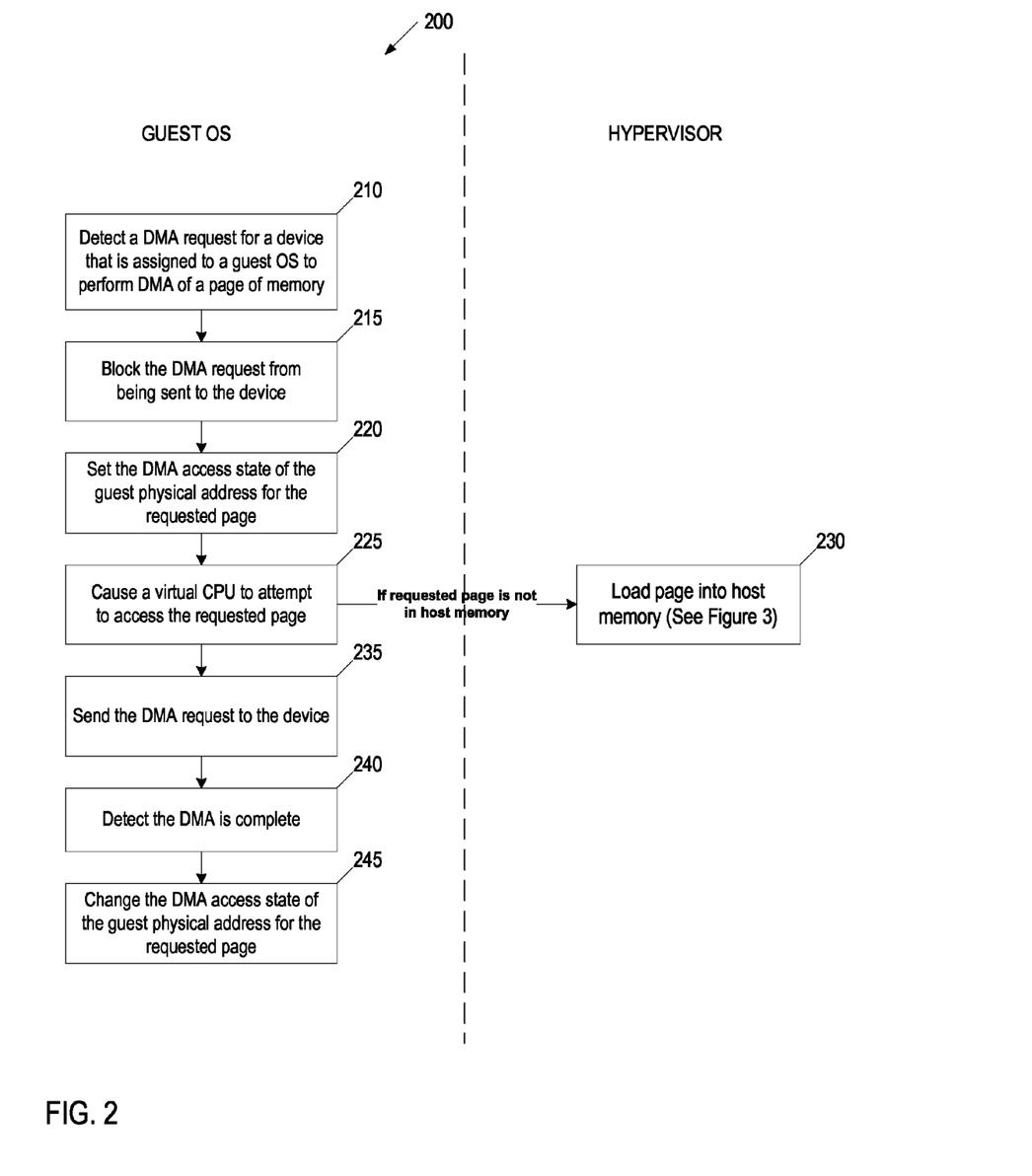
FIG. 2 is a flow diagram illustrating one implementation of a method for performing direct memory access (DMA) by a device that is assigned to a guest operating system (OS), in accordance with one or more implementations of the present disclosure.

FIG. 2 is a flow diagram illustrating one implementation of a method 200 for performing DMA by a device that is assigned to a guest operating system, in accordance with one or more implementations of the present disclosure. The method 200 may be performed by a computer system 500 of FIG. 5 that may comprise hardware (e.g., circuitry, dedicated logic, programmable logic, microcode, etc.), software (e.g., instructions run on a processing device), or a combination thereof. In one implementation, the method 200 is performed by a guest OS 140 of FIG. 1.

At block 210, the guest OS detects a DMA request for a device assigned to a guest OS to perform DMA of a page of memory. The guest OS can monitor the device driver and detect that the device driver receives instructions, for example, from a process running in the virtual machine to perform a DMA operation by the device that is assigned to the guest OS. The DMA request can include a guest physical address for the requested page of memory.

At block 215, the guest OS blocks the DMA request from being sent to the device. The guest OS can trap the device driver and obtain control to block the device driver from sending the DMA request to the device. At block 220, the guest OS sets the DMA access state of the guest physical address for the requested page of memory to indicate that the requested page is to be accessed by DMA and should not be a candidate page for a swap out operation. In one implementation, the guest OS sets an access state bit to a value of one to indicate that the page is to be accessed by DMA and should not be a candidate to be swapped out from host memory.

At block 225, the guest OS causes a virtual CPU to attempt to access the requested page of memory at the particular guest physical address. If the page is not resident in the host memory, the host OS triggers a page fault, the virtual CPU loses control, and at block 230, the host OS gives control to the hypervisor to load the page in the host memory, as described in greater detail below in conjunction with FIG. 3. The hypervisor then restarts the virtual CPU, and control is returned to the virtual CPU.

At block 235, the guest OS sends the DMA request to the device. The guest OS can return control the device driver to allow the device driver to send the DMA request to the device. The device can receive the DMA request and use an IOMMU page table to access the page in the host memory for the DMA request. The device can send the DMA request to the host IOMMU that can determine whether a guest physical address, which is in a device's DMA request, has a valid mapping in the IOMMU page table. A guest physical address has a valid mapping if the guest physical address has a corresponding present bit enabled in the IOMMU page table. A guest physical address has an invalid mapping if the guest physical address has a corresponding present bit that is disabled in the IOMMU page table. If a DMA request is made to a guest physical address that has an invalid mapping, the DMA request will be denied. If the guest physical address has a valid mapping, the host IOMMU grants the device the request.

At block 240, the guest OS detects the DMA operation is complete. The guest OS may receive a message from the device or the device driver indicating that the DMA operation is complete. For example, the device can notify the device driver that the DMA has completed, and the device driver forwards the notification to the guest OS.

At block 245, the guest OS changes the access state in the DMA state table for the guest physical address for the page associated with the completed DMA operation to indicate that the page is not being accessed by DMA or going to be accessed by DMA in the near term, and to allow the page to be a candidate page for a swap out operation. In implementation, the guest OS sets an access state bit to a value of zero to indicate that the page can be swapped out from host memory.

Figure 3:
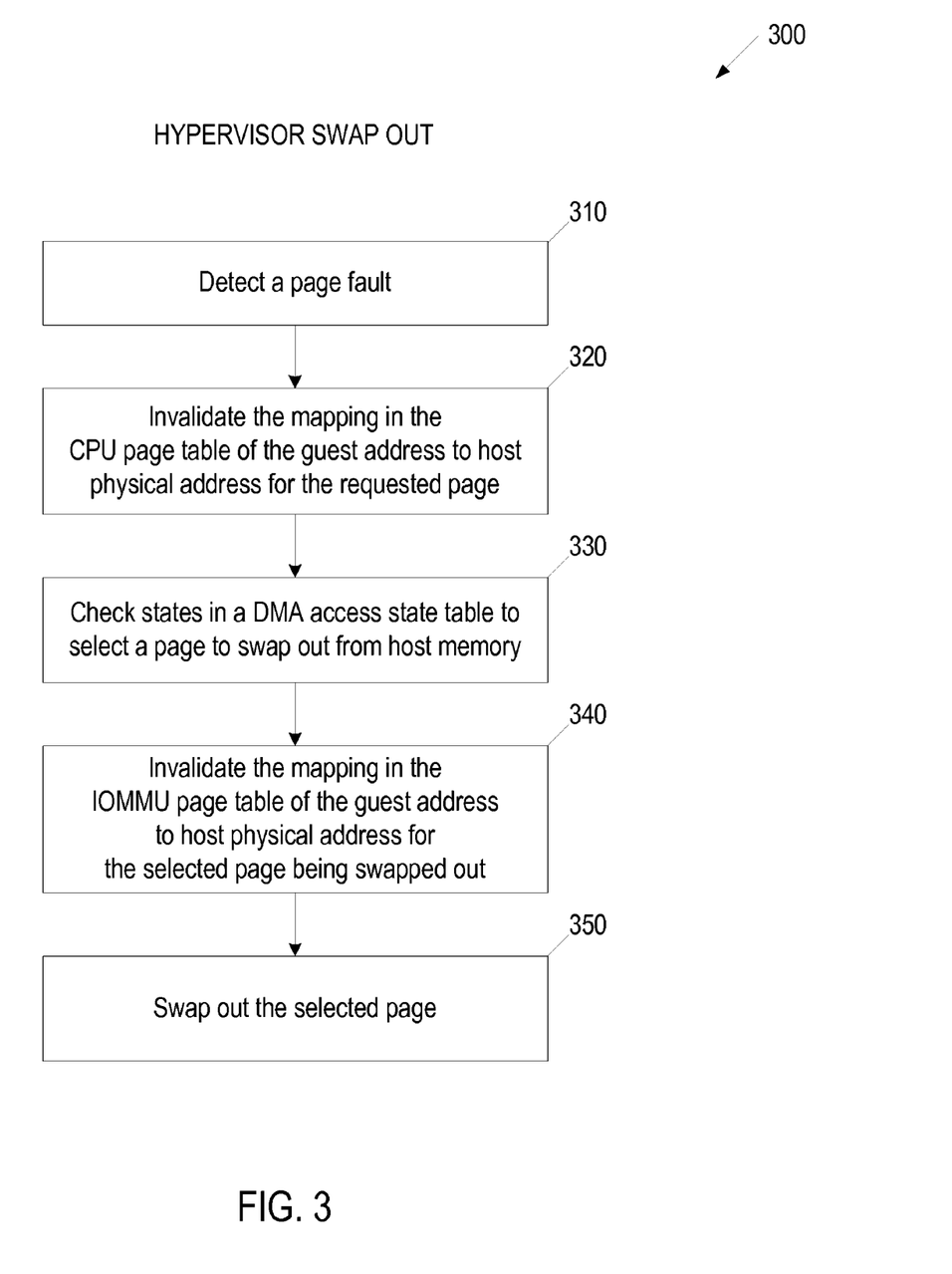
FIG. 3 is a flow diagram for a method for swapping out a page for DMA by a device assigned to a guest OS, in accordance with one or more implementations of the present disclosure.

FIG. 3 is a flow diagram for a method 300 for swapping out a page for DMA by a device assigned to a guest OS, in accordance with one or more implementations of the present disclosure. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one implementation, method 300 is performed by a hypervisor (e.g., hypervisor 125 of FIG. 1).

At block 310, the hypervisor detects a page fault. The page fault can be triggered by a virtual CPU accessing a page that is not resident in host memory. The access by the virtual CPU is associated with a device that is assigned to a guest OS to perform DMA of the requested page. At block 320, the hypervisor invalidates a mapping in the CPU page table for a candidate page for swapping out of host memory. The hypervisor can select a candidate page using a page replacement algorithm. Invalidating the mapping for the candidate page in the CPU page table will prevent the virtual CPU from accessing the page directly. The hypervisor invalidates the mapping in the CPU page table for the candidate page by clearing (e.g., setting to a zero value) its present bit.

At block 330, the hypervisor checks the DMA access state for the candidate page to confirm whether or not the candidate page can be swapped out. If the DMA access state for the candidate page is enabled, the candidate page cannot be swapped out and the page is no longer a candidate for a swap out operation. The hypervisor re-validates the mapping of the page in the CPU page. The hypervisor selects another candidate page using a page replacement algorithm and invalidates the mapping for the other candidate page at block 320, and checks the DMA access state for the other candidate page to confirm whether or not the other candidate page can be swapped out at block 330.

If the DMA access state for a candidate page is disabled, the candidate page can be swapped out, and the hypervisor invalidates the mapping of a guest physical address to a host physical address in an IOMMU page table for the candidate page that is being swapped out of the host memory at block 340. The hypervisor invalidates the mapping by clearing the present bit, which corresponds to the candidate page being swapped out, in the IOMMU page table to indicate that the candidate page is not present in the host memory. In one implementation, the hypervisor also clears a cache in the computing system that may store the candidate page that is being swapped out or a mapping of the candidate page that is being swapped out.

As an optional optimization, the guest OS can perform a batch of DMA operations and notify the hypervisor when the batch is complete to allow the hypervisor to perform a swap out operation. Depending on whether the DMA access state can confirm that a candidate page can be swapped out at block 330, the hypervisor may have to make several attempts to invalidate mappings for candidate pages at block 320 because the candidate pages may continue to be accessed, for example, as indicated by DMA access states that are enabled. The hypervisor may not be able to confirm that a candidate page can be swapped out for some time. In one implementation, the guest OS increments a counter for each time a DMA access state is changed. After a threshold number of changes is satisfied by the counter, the guest OS can notify the hypervisor to perform a swap out operation. In one implementation, the guest OS increments a counter for each time a DMA access operation is completed. After a threshold number of DMA access operations being completed is satisfied by the counter, the guest OS can notify the hypervisor to perform a swap out operation. At block 360, the hypervisor performs the swap out operation to remove the candidate page from the host memory.

Figure 4:
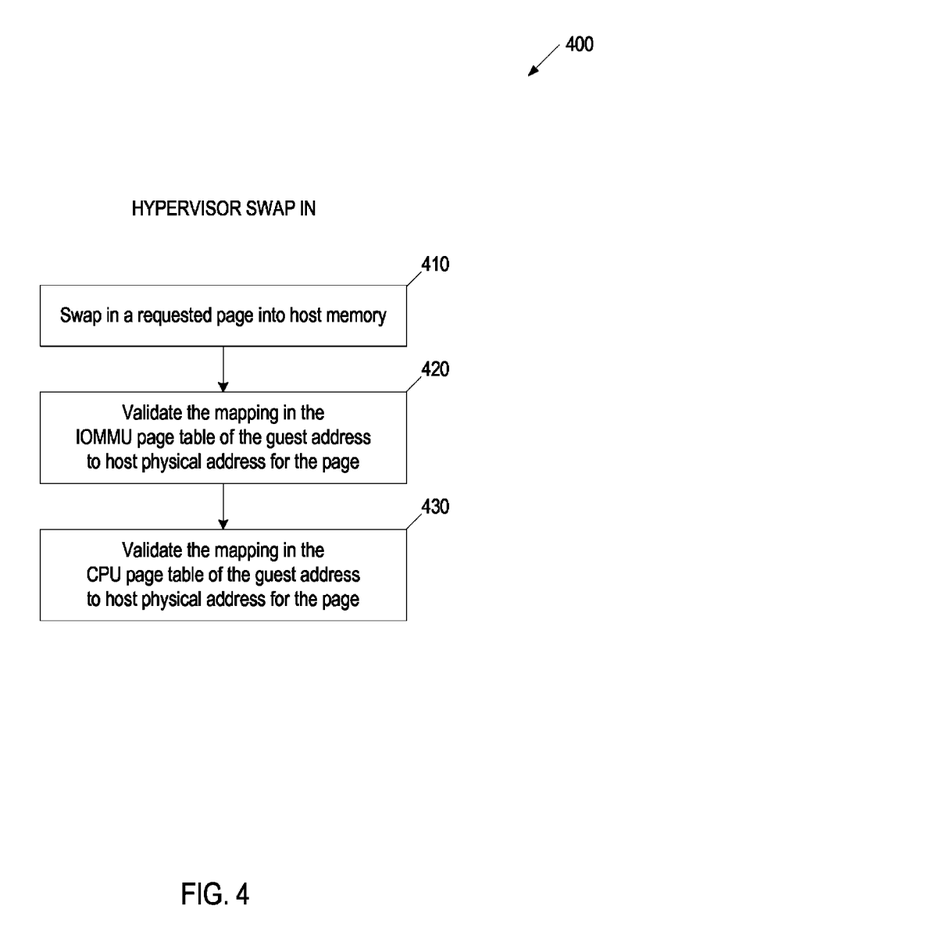
FIG. 4 is a flow diagram for a method for swapping in a page for DMA by a device assigned to a guest OS, in accordance with one or more implementations of the present disclosure.

FIG. 4 is a flow diagram for a method 400 for swapping in a page for DMA by a device assigned to a guest OS, in accordance with one or more implementations of the present disclosure. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one implementation, method 400 is performed by a hypervisor (e.g., hypervisor 125 of FIG. 1).

At block 410, the hypervisor swaps in a requested page into the host physical memory. At block 420, the hypervisor validates the mapping of the page being swapped into the host memory in the IOMMU page table to indicate that the requested page is present in the host memory and to enable the device to access the requested page. The hypervisor validates the mapping in the IOMMU page table by enabling the present bit for the guest physical address of requested page being swapped in. At block 430, the hypervisor validates the mapping of the requested page from the guest physical address to the host physical address for the page being swapped into the host memory in the CPU page table. The hypervisor validates the mapping in the CPU page table by enabling the present bit for the guest physical address of requested page being swapped in. The enabling of the present bit avoids having to exit to the hypervisor when subsequent DMA requests are made for the page.

Figure 5:
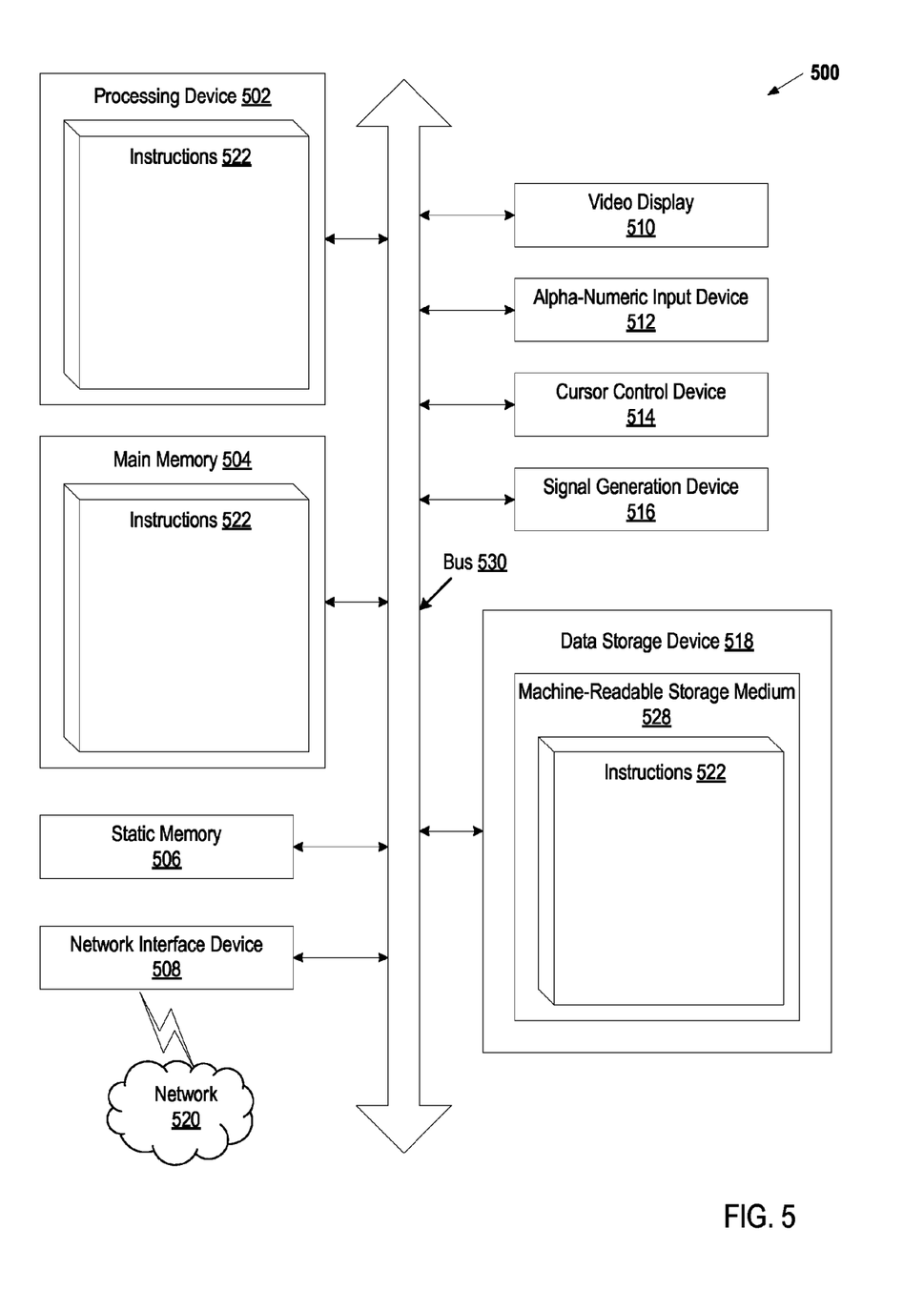
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data store device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT), an alphanumeric input device 512 (e.g., a keyboard), a cursor control device 514 (e.g., a mouse), and a signal generation device 516 (e.g., speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during during execution thereof by the computer system 500, the main memory 504 and the processing device 502 also constituting machine-readable storage media.

In one implementation, the instructions 522 include instructions for a guest operating system, and/or instructions for a hypervisor. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting" or "setting" or "sending" or "causing" or "sending" or "incrementing" or "determining" or "notifying" or "changing" or "invalidating" or "checking" or "removing" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   detecting a page fault associated with a request for a device assigned to a guest operating system to perform direct memory access (DMA) of a requested page of memory;
   invalidating a mapping in a central processing unit (CPU) page table of a guest physical address to a host physical address for a candidate page for being swapped out of host memory;
   checking, by a hypervisor executing on a processing device, a DMA access state of the candidate page to determine whether or not the candidate page can be swapped out from the host memory; and
   in response to determining that the DMA access state for the candidate page indicates that the candidate page can be swapped out:
      removing the candidate page from the host memory; and
      invalidating a mapping in an input/output memory management unit (IOMMU) page table of the guest physical address to the host physical address for the candidate page.

2. The method of claim 1, wherein the DMA access is read access.

3. The method of claim 1, further comprising:
   determining from the DMA access state for the candidate page that the candidate page cannot be swapped out;
   invalidating a mapping in the CPU page table of a guest physical address to a host physical address for another candidate page for being swapped out of the host memory; and
   checking a DMA access state of the other candidate page to determine whether or not the other candidate page can be swapped out from the host memory.

4. The method of claim 1, further comprising:
   determining from the DMA access state for the candidate page that the candidate page cannot be swapped out;
   receiving a notification from the guest operating system to perform a swap out operation; and
   removing the candidate page from the host memory.

5. The method of claim 1, wherein checking the DMA access state of the candidate page comprises:
   reading an access state for the candidate page in a DMA state table for a virtual machine corresponding to the guest operating system, wherein the DMA state table is stored in shared memory accessible by the hypervisor.

6. The method of claim 1, further comprising:
   loading in the requested page into the host memory;
   validating a mapping of the loaded page in the IOMMU page table of a guest physical address to a host physical address for the loaded page to indicate that the requested page is present in the host memory; and
   validating a mapping of the loaded page in the CPU page table.

7. The method of claim 1, wherein an entire virtual memory that is assigned to the guest operating system is allocated to the device for DMA.

8. A system comprising:
   a memory;
   a processing device, operatively coupled to the memory to:
      detect a page fault associated with a request for a device assigned to a guest operating system to perform direct memory access (DMA) of a requested page of memory;
      invalidate a mapping in a central processing unit (CPU) page table of a guest physical address to a host physical address for a candidate page for being swapped out of host memory;
      check a DMA access state of the candidate page to determine whether or not the candidate page can be swapped out from the host memory; and
      in response to determining that the DMA access state for the candidate page indicates that the candidate page can be swapped out:
         remove the candidate page from the host memory; and
         invalidate a mapping in an input/output memory management unit (IOMMU) page table of the guest physical address to the host physical address for the candidate page.

9. The system of claim 8, wherein the DMA access is read access.

10. The system of claim 8, wherein the processing device is further to:
    determine from the DMA access state for the candidate page that the candidate page cannot be swapped out;
    invalidate a mapping in the CPU page table of a guest physical address to a host physical address for another candidate page for being swapped out of the host memory; and
    check a DMA access state of the other candidate page to determine whether or not the other candidate page can be swapped out from the host memory.

11. The system of claim 8, wherein the processing device is further to:
    determine from the DMA access state for the candidate page that the candidate page cannot be swapped out;
    receive a notification from the guest operating system to perform a swap out operation; and
    remove the candidate page from the host memory.

12. The system of claim 8, wherein to check the DMA access state of the candidate page, the processing is device to:
    read an access state for the candidate page in a DMA state table for a virtual machine corresponding to the guest operating system, wherein the DMA state table is stored in shared memory accessible by the hypervisor.

13. The system of claim 8, wherein the processing device is further to:
    load in the requested page into the host memory;
    validate a mapping of the loaded page in the IOMMU page table of a guest physical address to a host physical address for the loaded page to indicate that the requested page is present in the host memory; and
    validate a mapping of the loaded page in the CPU page table.

14. The system of claim 8, wherein an entire virtual memory that is assigned to the guest operating system is allocated to the device for DMA.

15. A non-transitory computer-readable storage medium including instructions that, when executed by a processing device, cause the processing device to:
- detect a direct memory access (DMA) request for a device assigned to a guest operating system to perform DMA of a page of memory;
- prior to the page being accessed, set a DMA access state of a guest physical address for the requested page of memory to indicate that the requested page is to be accessed by DMA;
- cause, by the processing device, a virtual central processing unit (CPU) to attempt to access the requested page of memory; and
- send the DMA request to the device for the device to access the requested page of memory.

16. The non-transitory computer-readable storage medium of claim 15, wherein the processing device is further to:
- increment a counter for each time a DMA access state is changed;
- determine a threshold number of changes is satisfied by the counter; and
- notify a hypervisor to perform a swap out operation based on the threshold being satisfied.

17. The non-transitory computer-readable storage medium of claim 13, wherein the processing device is further to:
- detect a DMA operation for the DMA request is complete; and
- change a state in a DMA state table for a guest physical address for the page associated with the DMA operation to indicate that the page is not being accessed by DMA.

18. The non-transitory computer-readable storage medium of claim 15, wherein the processing device is further to:
- create a DMA state table for a virtual machine corresponding to the guest operating system to monitor guest physical addresses of the virtual machine to be accessed by DMA, wherein the DMA state table is stored in shared memory and accessible by a hypervisor.

* * * * *